US010089678B1

(12) United States Patent
Buist et al.

(10) Patent No.: US 10,089,678 B1
(45) Date of Patent: Oct. 2, 2018

(54) SUSPICIOUS ORDER MONITORING SYSTEM AND METHOD

(71) Applicant: MALLINCKRODT LLC, St. Louis, MO (US)

(72) Inventors: Jennifer M. Buist, Chesterfield, MO (US); Thomas E. Duffel, Barnhart, MO (US); Karen A. Harper, St. Louis, MO (US); Donald A. Lohman, Webster Groves, MO (US); David M. Scheu, St. Louis, MO (US); Gail S. Tetzlaff, Florissant, MO (US)

(73) Assignee: SpecGX LLC, Webster Groves, MO (US)

( * ) Notice: Subject to any disclaimer, the term of this patent is extended or adjusted under 35 U.S.C. 154(b) by 156 days.

(21) Appl. No.: 14/192,971

(22) Filed: Feb. 28, 2014

Related U.S. Application Data (60) Provisional application No. 61/771,203, filed on Mar. 1, 2013.

(51) Int. Cl.
G06Q 30/06 (2012.01)

(52) U.S. Cl.
CPC .................. *G06Q 30/0635* (2013.01)

(58) Field of Classification Search
CPC ....... G06Q 30/0601–30/0645; G06Q 30/0635; G06Q 30/06–30/08
USPC .................... 705/26.1–27.2, 26.81
See application file for complete search history.

(56) References Cited

U.S. PATENT DOCUMENTS

| 7,870,608 | B2 | 1/2011 | Sharaim et al. | |
|---|---|---|---|---|
| 2003/0229519 | A1 | 12/2003 | Eidex et al. | |
| 2006/0100920 | A1 | 5/2006 | Pretorius et al. | |
| 2007/0073630 | A1* | 3/2007 | Greene | G06Q 20/40 705/80 |
| 2009/0192810 | A1* | 7/2009 | Filatov | G06Q 10/00 705/318 |
| 2010/0106611 | A1* | 4/2010 | Paulsen | G06Q 20/10 705/26.1 |
| 2011/0078201 | A1* | 3/2011 | Ryan | G06F 17/30327 707/792 |
| 2011/0238593 | A1* | 9/2011 | Hearnes, II | G06F 17/30876 705/341 |

* cited by examiner

Primary Examiner — Ming Shui (57) ABSTRACT

A system and method is provided for identifying and reporting suspicious orders for substances and/or products. The system executes an application to process order detail data included in a received order request for a particular item. The application includes a plurality of processing rules that identify suspicious orders based on the order detail data and historical data. The application assigns a hold attribute value to a hold flag associated with the order when the order is determined to be suspicious by one of the plurality of processing rules and transmits a hold notification via communication network to one or more predetermined individual/entities. The application also selectively stores detail data, audit data, and historical data in at least one of a plurality of data tables.

20 Claims, 6 Drawing Sheets

SUSPICIOUS ORDER MONITORING SYSTEM AND METHOD

RELATED APPLICATIONS

This application claims priority under 35 U.S.C. § 119(e) to U.S. Provisional Patent Application No. 61/771,203 entitled "Suspicious Order Monitoring System and Method" filed on Mar. 1, 2013 and which is hereby incorporated by reference herein.

FEDERALLY SPONSORED RESEARCH OR DEVELOPMENT

Not Applicable.

COMPACT DISK APPENDIX

Not Applicable.

BACKGROUND

Manufacturers and distributors of controlled substances are required to comply with various federal and state regulations. Such regulations may require manufacturers and distributors to maintain records of substance types, quantities, customers, and other pertinent information associated with orders and/or shipment of controlled substances. A controlled substance is generally understood to be a drug or chemical substance whose possession and use are regulated under the United States' Controlled Substances Act, such as, for instance, narcotic drugs and other substances that have abuse potential. Under federal regulations, entities that distribute controlled substances also have an affirmative duty to develop and implement systems and processes to detect and report suspicious activity relating to orders for controlled substances. Suspicious orders may include orders of unusual size, orders deviating substantially from a normal pattern, and orders of unusual frequency. Failure to do so may result in fines and/or loss of privilege to ship such substances.

Conventional systems and processes for monitoring suspicious activity are often static and simplistic. For example, such conventional systems may involve simply comparing the quantity of a particular controlled substance specified in an order to a fixed or predetermined maximum quantity for that particular controlled substance. Such simplistic systems can result in over reporting of suspicious order activity. Moreover, such systems can result in under reporting of suspicious orders by customers that have discovered how to avoid detection by such systems. Thus, systems and processes are needed that can identify suspicious orders more efficiently based on dynamic thresholds that are determined based on a plurality of historical considerations.

SUMMARY

According to one aspect, a method is provided for identifying a suspicious order for an item. The method includes identifying order detail data included in a particular order received at a processor. The order detail data includes an item identification code for a particular item, a customer identification code for a particular customer, and an order type. The method also includes processing the order detail data according to first processing rules at the processor to determine if the order is suspicious and storing the order detail data in a first data table when the order is determined to be suspicious based on the first processing rules. The method also includes processing the order detail data at the processor according to second processing rules to determine if the order is suspicious when the order detail data has not been processed according to the first processing rules or third processing rules. The method also includes storing the order detail data in a second data table if the order is determined to be suspicious based on the second processing rules. The method also includes processing the order detail data according to third processing rules at the processor to determine if the order is suspicious when the order detail data has not been processed according to the first processing rules or the second processing rules. The method also includes storing the order detail data in a third data table if the order is determined to be suspicious based on the third processing rules. The method also includes assigning a hold attribute value to a hold flag associated with the order when the order is determined to be suspicious by one of the first processing rules, second processing rules, or third processing rules. The method further includes transmitting a hold notification via communication network to network addresses of one or more predetermined individuals when the hold flag associated with the order has the hold attribute value.

According to another aspect, a system is provided for identifying a suspicious order for an item. The system includes at least one processor and one or more data sources. The one or more data sources include a first tier table, a second tier table; and a third tier table. The system also includes an application that is executed by the at least one processor to identify order detail data included in an order received from the at least one processor. The order detail data includes an item identification code for a particular item, a customer identification for a particular customer, and an order type. The executed application also processes the order detail data according to first processing rules to determine if the order is suspicious and stores the order detail data in a first data table when the order is determined to be suspicious based on the first processing rules. The executed application also processes the order detail data according to second processing rules to determine if the order is a suspicious order when the order detail data has not been processed according to the first processing rules or third processing rules. The method also includes storing the order detail data in a second data table if the order is determined to be suspicious based on the second processing rules. The executed application also processes the order detail data according to third processing rules to determine if the order is suspicious when the order detail data has not been processed according to the first processing rules or the second processing rules. The method also includes storing the order detail data in a third data table if the order is determined to be suspicious based on the third processing rules. The executed application also assigns a hold attribute value to a hold flag associated with the order when the order is determined to be suspicious by one of the first processing rules, second processing rules, and third processing rules. The executed application transmits a hold notification via communication network to network addresses of one or more predetermined individuals when the hold flag associated with the order has the hold attribute value.

DETAILED DESCRIPTION

Aspects of a suspicious order monitoring system (SOMS) 100 described herein provide an improved system and method for identifying and reporting suspicious orders for substances and/or products. The examples discussed herein primarily describe the use and application of the SOMS 100 in connection with the distribution of controlled substances. However, it should be understood that the SOMS 100 could be used in connection with the sales or purchase of other types of products and/or services where there is a potential for suspicious order activity in connection with the purchases of such products and/or services.

According to one aspect, the SOMS 100 compares an order quantity for a particular product or substance (item) associated with a particular order to a threshold quantity for that particular item during a specified time period (e.g., month) to determine whether to designate that particular order as suspicious. According to another aspect, the SOMS 100 compares an order quantity for a particular item or the number of orders received from a customer to threshold values to determine whether to designate that particular order as suspicious.

Figure 1A:
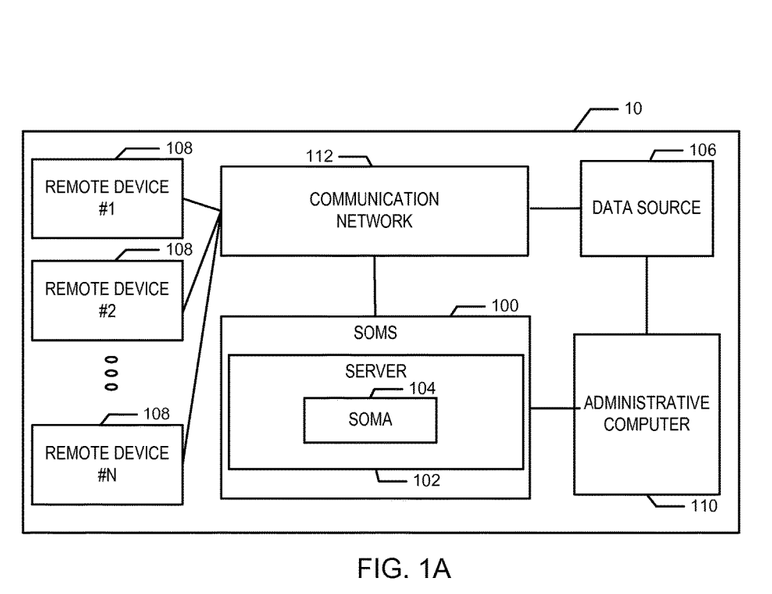
FIG. 1A is a block diagram of a computing system that includes a suspicious order monitoring system.

FIG. 1A depicts an exemplary computing system 10 that includes a SOMS 100 in accordance with aspects of the invention. The SOMS 100 includes a server 102 or other computing device or system that includes a suspicious order monitoring application (SOMA) 104. The SOMS 100 is communicatively linked to a data source 106 and one or more remote computing devices (e.g., remote device #1-#N) 108 via a communication network 112. The data source 106 may be a database of another computing device or computing system. The SOMS 100 is also linked to an administrative computing device 110 via a wired and/or wireless communication link.

Although the administrative computing device 110 is described as being connected to the SOMS 100 via a wired communication link, it is contemplated that the administrative computing device 110 may be connected to the SOMS 100 via the communication network 112 in other aspects. Moreover, although the data source 106 is shown as being located remotely from the server 102, it is contemplated that the data source 106 can be located on, at, or within the server 102 in other aspects of the SOMS 100.

The server 102 is a computer or computing device that includes one or more processors and volatile and/or non-volatile memory and executes the SOMA 104 to manage the storage of order detail data in the data source 106 and to manage the generation of suspicious order notifications or reports. The server 102 is configured to receive data from and/or transmit data to the one or more remote devices 108 through the communication network 112. Although the SOMS 100 is depicted as including a single server 102, it is contemplated that the SOMS 100 may include multiple servers in other aspects. For example, the SOMS 100 may include multiple computer systems in a cloud computing configuration.

The communication network 112 can be the Internet, an intranet, or another wired or wireless communication network. For example, communication network 112 may include a Mobile Communications (GSM) network, a code division multiple access (CDMA) network, 3rd Generation Partnership Project (3GPP), an Internet Protocol (IP) network, a Wireless Application Protocol (WAP) network, a WiFi network, or an IEEE 802.11 standards network, as well as various combinations thereof. Other conventional and/or later developed wired and wireless networks may also be used. In this example, each of the remote devices 108, the local server 102, and the data source 106 may communicate data between each other using a Hypertext Transfer Protocol (HTTP) or a Wireless Application Protocol (WAP). Other examples of communication protocols exist.

The data source 106 stores order detail data for a particular order received at the server 102 from the one or more remote devices 108. The data source 106 may also store historical order data, order allocation data, and audit data. According to one aspect, an authorized user may interact with the administrative computing device 110 to enter or specify, for example, threshold data and/or modify other order data. Notably, the SOMA 104 is configured to record audit data, such as an entry type and an entry time, for data entries submitted to the data source 106 via the administrative computing device 110 and/or the SOMA 104.

Figure 1B:
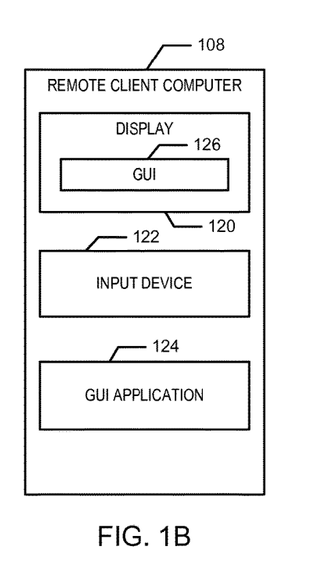
FIG. 1B depicts an exemplary embodiment of a remote computing device according to one aspect of the suspicious order monitoring.

FIG. 1B depicts an exemplary embodiment of the remote device 108 according to one aspect of the SOMS 100. The remote device 108 is a computing or processing device that includes one or more processors and memory and is configured to receive data and/or communications from, and/or transmit data and/or communications to the server 102 via the communication network 112. For example, the remote device 108 can be a laptop computer, a personal digital assistant, a tablet computer, standard personal computer, or another processing device. The remote device 108 includes a display 120, such as a computer monitor, for displaying data and/or graphical user interfaces. The remote device 108 may also include an input device 122, such as a keyboard or a pointing device (e.g., a mouse, trackball, pen, or touch screen) to enter data into or interact with graphical user interfaces.

Each remote device 108 may also include a graphical user interface (or GUI) application 124, such as a browser application, to generate a graphical user interface 126 on the display 120. The graphical user interface 126 enables a user of the remote device 108 to interact with various data entry forms to submit order detail data to the SOMS 100 for the purpose of ordering a controlled substance. After entering the order detail data, an order request (order) is generated. The order includes the entered order detail data and is transmitted to the SOMS 100.

According to another aspect, the order detail data may be collected during a telephone conversation. For example, the proprietor or representative of the business/entity desiring to order a controlled substance may provide the order detail data to an administrator or authorized user of the SOMS 100 during a telephone and/or an in-person conversation. Thereafter, the authorized user of the SOMS 100 may use the administrative computing device 110 to complete a data entry form to generate an order to submit to the SOMS 100.

Figure 1C:
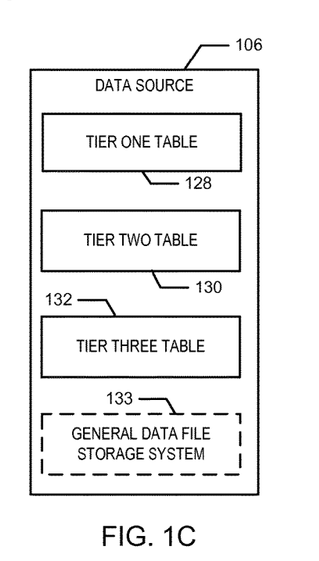
FIG. 1C depicts an exemplary embodiment of a data source according to an aspect of the suspicious order monitoring system.

FIG. 1C depicts an exemplary embodiment of a data source 106 according to one aspect of the SOMS 100. The data source 106 is, for example, a tertiary data source that is accessible by the SOMS 100 and may include one or more databases or tables. As discussed above, the data source 106 includes order detail data, historical order data, order allocation data, and audit data. In this example, the data source 106 includes at least three tables: a tier one table 128; a tier two table 130; and a tier three table 132. According to another aspect, the data source 106 may include general data file storage system 133, such as a JDE file system, that stores various files, such as detail and summary audit files, sales ledger file, reporting files, etc.

Figure 1D:
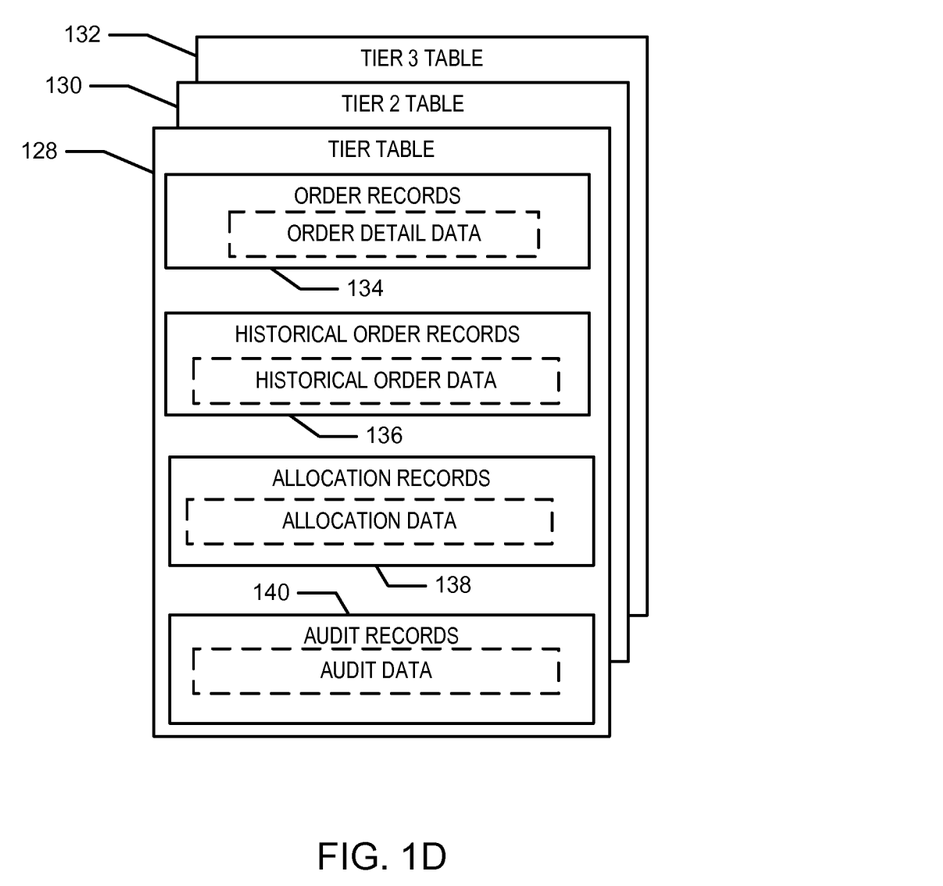
FIG. 1D depicts an exemplary embodiment of a tier table according to an aspect of the suspicious order monitoring system.

FIG. 1D depicts an exemplary tier table (e.g., tier tables 128-132). Each of the tier tables 128-132 may store one or more of the order records 134 for orders received at the local server 102 from the one or more remote devices 108. Each order record 134 includes corresponding order detail data.

According to one aspect, the order detail data associated with a particular order is stored into one of the tier tables 128-132 according to one or more processing rules. For example, as explained in more detail below, after receiving an order for a particular substance, the SOMS 100 executes the SOMA 104 to process order detail included in a particular order according to tier one, tier two, and/or tier three processing rules and stores the order detail data in a corresponding one of the tier one table (e.g., tier table 128), a tier two table (tier table 130), or a tier three table (tier table 132). The order record 134 may also include a flag attribute value for each received order that indicates whether the order is deemed suspicious. As described in more detail below, the flag attribute can be a code, symbol, or other indicator.

According to another aspect, each of the tier tables may store one or more historical order records 136. Each historical order record 136 may include historical data, such as the quantities of a particular item ordered per customer. The historical order record may also include count totals for the total quantity of each item ordered per customer and/or count totals for the total number of orders submitted per customer during a predetermined span of time (e.g., current-month-to-date).

The historical order record 136 may further include a calculated average order threshold and/or a calculated average quantity threshold based on a historical order data for one or more customers over a predefined period of time (e.g., 18 months). The calculated average order threshold and/or a calculated average quantity threshold may be automatically calculated by the SOMA 104 at predetermined intervals (e.g., weekly, bi-weekly, monthly, etc.). Alternatively, the calculated average order threshold and/or the calculated average quantity threshold may be entered by an authorized user of the administrative computing device.

Each of the tier tables 128-132 may store one or more order allocation records 138. Each allocation record 138 may include allocation data, such as a specific threshold value or a threshold percentage increase in order quantities or total orders for a particular item or per customer. Each of the tier tables 128-132 stores one or more order audit records 140. Each audit record 140 includes audit data for data entries or modifications made to any of records 134-140.

Although each of the tier tables 128, 130, 132 are depicted as storing similar data, it is contemplated that each of the tier tables may be configured to store additional and/or disparate data in other aspects. For example, according to one aspect, only the tier two table (tier table 130) includes historical records that include count total data, the calculated average order threshold data, and/or the calculated average quantity threshold data.

Although the SOMS 100 is depicted as communicating with a single data source 106 that includes three tier tables, it is contemplated that the SOMS 100 may communicate with multiple data sources. In such an embodiment, each of the multiple data sources may separately maintain one of the tier one, tier two, and tier three tables 128, 130, 132.

Figure 2:
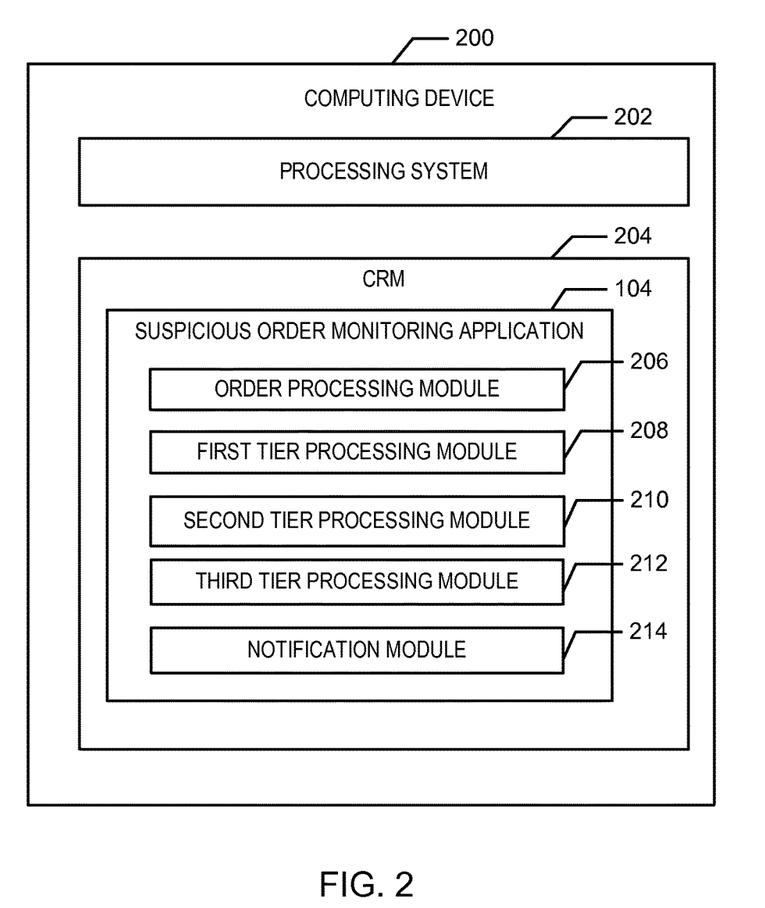
FIG. 2 is a block diagram of a computing device configured with a suspicious order monitoring application according to one aspect of the suspicious order monitoring system.

FIG. 2 is a block diagram depicting an exemplary SOMA 104 executing on a computing device 200. According to one aspect, the computing device 200 includes a processing system 202 that includes one or more processors or other processing devices. The processing system 202 executes the SOMA 104 to process order data received from a remote computing device (not shown).

According to one aspect, the computing device 200 includes a computer readable medium ("CRM") 204 configured with the SOMA 104. The SOMA 104 includes instructions or modules that are executable by the processing system 202 to determine if a received order is a suspicious order.

The CRM 204 may include volatile media, nonvolatile media, removable media, non-removable media, and/or another available medium that can be accessed by the computing device 200. By way of example and not limitation, the CRM 204 comprises computer storage media and communication media. Computer storage media includes nontransient memory, volatile media, nonvolatile media, removable media, and/or non-removable media implemented in a method or technology for storage of information, such as computer readable instructions, data structures, program modules, or other data. Communication media may embody computer readable instructions, data structures, program modules, or other data and include an information delivery media or system.

An order processing module 206 receives an order from a remote computing device (e.g., remote device 108). As described above, the user of the remote device 108 interacts with the input device 122 and one or more input forms to enter order detail data and generate an order that is transmitted to the SOMS 100. Alternatively, as explained above, the order may be entered by an administrator or other authorized user based on instructions received from a customer. The order processing module 206 identifies order detail data included in the received order. For example, the order processing module 206 processes the order in order to determine an item, a bill to customer identification (ID), an item number, a desired quantity, and/or a tier type associated with the order. The order processing module 206 then stores the order detail data in the data source 104.

According to one aspect, the order processing module 206 executes upon the receipt of an order at the SOMS 100. According to another aspect, the order processing module 206 executes at predetermined intervals to process one or more received orders. For example, the order processing module 206 may execute at fifteen minute intervals and process all orders stored in a memory queue accessible by the server 102 according to first in first out (FIFO) processing.

A first tier processing module 208 executes to determine a monthly limit on particular items (e.g., Oxycodone 15 mg and 30 tablets) purchased by a particular customer as identified by that customer's Bill To Address. For example, if the particular item ordered is Oxycodone, the processing module 208 may determine a monthly limit of 15 mg and 30 tablets is associated with that customer's Bill To Address.

According to one aspect, the tier one processing rules first determine whether the particular order is from a current month and year. For example, the tier one processing rules requires identifying a date and/or time from the order detail data associated with the particular order. If the identified date and time corresponds to current month and year, that particular order will deemed a valid order. Alternatively, if the identified date and time does not correspond to current month or year, that particular order will be deemed an invalid order.

The tier one processing rules also identify the order type to determine whether that particular order is valid. For example, the tier one processing rules require determining from the order detail data whether the order type is an electronic order received from a known customer (i.e., valid bill to customer ID) via communication network (e.g., online order) or manual order entered via an authorized administrator. If the particular order is not identified as either an electronic order or an administrative order, that particular order will deemed invalid.

The first tier processing module 208 is configured to only process new orders that have not been previously processed according to the tier one processing rules and identified as valid.

The first tier processing module 208 further processes the order detail data included in a particular order generated by a customer according to the tier one processing rules to determine whether to flag or otherwise identify that particular order as suspicious or unusual. According to another aspect, the tier one processing rules identifies the particular order as suspicious by determining whether a particular customer associated with the particular order has exceeded a threshold quantity for a particular item during a predetermined time period. For example, the first tier processing module 208 processes the order detail data included in the particular order to identify a particular customer from the customer ID, a particular item from the item ID, and a desired quantity of the particular product. The first tier processing module 208 then retrieves the threshold quantity for the particular item for that particular customer from the allocation record in the tier one table 128.

The first tier processing module 208 then queries the tier one table 128 to identify a matching customer ID and item ID and then calculates a total order quantity, including the desired quantity specified in the particular order, of the particular product. The total order quantity is, for example, a total quantity that has been ordered month to date. If the total order quantity is less than (or equal to) a threshold total order quantity specified by the tier one processing rules, then the particular order is not deemed suspicious.

According to one aspect, the first tier processing module 208 assigns a hold attribute value to a hold flag, or other indicator, associated with the particular order if the total order quantity exceeds the threshold order quantity. For example, the first tier processing module 208 assigns a hold attribute value of, for example, "Yes", "1", etc. to the hold flag associated with the order if the total order quantity exceeds the threshold order quantity to indicate that the particular order is invalid or suspicious. According to one aspect, a non-hold attribute value of, for example, "No", "0", or other null value is assigned to the -hold flag to indicate the order is not a suspicious order.

The first tier processing module 208 stores the order detail data included in the particular order in the tier one table 128. The first tier processing module 208 also stores the assigned attribute value for the hold flag in the corresponding order record in the tier one table 128 in the data source 106. According to one aspect, when the attribute value assigned to the hold flag indicates the order is suspicious, that order is placed on hold by the SOMS 100. According to one aspect, the corresponding order detail of any record marked as hold will be saved to the reporting file in the general data file storage system 133 and an audit record is written to the tier one hold table 128. The order detail saved to the reporting file 133 is for reporting only. The reporting file is volatile and after the reporting completes the file is cleared.

According to one aspect, the monthly count data corresponds to the calculated total quantity for a particular item ordered by the particular customer during the month. The monthly count data is used, for example, by the SOMA 104 to calculate the average quantity threshold and/or average order thresholds described above. According to another aspect, rather than updating the historical record in the tier two table 130, the first tier processing module 208 updates summary audit files/data and sales ledger files in the general data file storage system 133 with the monthly count data and then writes a record to the reporting file general data file storage system 133.

A second tier processing module 210 executes for orders received from non-tier one customers for that include or identify stock keeping units (SKUs) associated with controlled substances, such as oxycodone 15 mg and 30 mg. The second tier processing module 210 also executes for orders all SKUs received from tier one except those that have been processed by the first processing module 208. For example, the second tier processing module 210 executes for all tier one customer orders except SKUs associated with oxycodone 15 mg and 30 mg, which are processed by the first processing module 208.

The second tier processing module 210 processes the order detail data included in a particular order according to tier two processing rules to determine whether to flag or otherwise identify a particular order as a suspicious order. In this example, the tier two processing rules require first determining whether the particular order was previously processed by tier one processing rules or tier three processing rules. If the particular order was previously processed by tier one processing rules or tier three processing rules, the second tier processing module 210 updates monthly count data maintained in the historical record in the tier two table. According to one aspect, the monthly count data corresponds to the calculated total orders for a particular item ordered by the particular customer during the month. The second tier processing module 210 then determines if there is another order to process.

If the particular order was not previously processed by tier one processing rules or tier three processing rules, the second tier processing module 210 determines if the particular order is exempt from tier two processing. For example, the second tier processing module 210 retrieves a list of exempt items also maintained in the data source 106 or some other data source. The second tier processing module 210 then compares an item identification code, such as a SKU or number, included in the order detail data to the list of exempt items to determine whether the item associated with the particular order is exempt from tier two processing. If the item is exempt, the second tier processing module 210 updates monthly count data maintained in the historical record in the tier two table based on the calculated total orders for a particular customer as count total data in a historical record in the tier two table and determines if there is another order to process.

If the item is not exempt, the second tier processing module 210 processes the order detail data included in a particular order to determine whether the particular order is from a new customer or determined as a new item. According to one aspect, a particular customer, as identified by a customer ID (e.g., bill to customer ID), will be designated as a new customer if orders have not been received from that particular customer within a predefined time period (e.g., 7 months). According to another aspect, a particular item, as identified by an item identification code (e.g., stock keeping unit (SKU)), included in a particular order will be designated as a new item if that particular order is placed by an existing or new customer and there is less than a certain amount of order history (e.g., less than seven months) for that particular item.

According to one aspect, the second tier processing module 210 assigns a new customer/item attribute value to a new customer/item flag, or other indicator, associated with the particular order if no other orders have been received from that particular customer within a predefined time period (e.g., 7 months). Alternatively, the second tier processing module 210 assigns a new customer/item attribute value to the new flag, or other indicator, associated with the particular order if that particular order is placed by an existing or new customer and there is less than a certain amount order history (e.g., less than seven months) for that particular item. The new customer/item attribute value is, for example, "Yes", "1", or any other value that indicates that the customer and/or item identified in the particular order are considered new. The second tier processing module 210 assigns non-new attribute value (No, Null, etc.) to the new customer/item flag associated with the order if the customer and item identified in the particular order are not considered new.

According to another aspect, the tier two processing rules also require determining whether the particular order is suspicious based on whether the number of orders received from a corresponding customer exceeds a calculated average order threshold. For example, the second tier processing module 210 processes the order detail data included in the particular order to identify a particular customer from the customer ID. The second tier processing module 210 then queries the tier two table to identify a matching customer ID and then calculates a global total order value. The global total order value includes the particular order and all orders associated with the identified customer ID received during a predetermined time interval. The global total order value is, for example, a total number of orders that a particular customer has submitted month to date. If the global total order value is less than (or equal to) the calculated average order threshold value, then the particular order is not deemed suspicious.

The calculated average order threshold is calculated, for example, based on a historical order data for one or more customers maintained in the tier two table. The calculated average order threshold corresponds to, for example, an average number of orders from one or more customers over an eighteen month period multiplied by a multiplier (e.g., 2, 3, or 4). The multiplier value is controlled by a value in processing options of the program. For example, a multiplier of 2.5 can be defined for tier two processing option in connection with a particular hold flag.

According to another aspect, the tier two processing rules also require determining whether the particular order is suspicious based on whether a quantity of a particular item ordered by a particular customer, has exceeded a calculated average quantity threshold. For example, the second tier processing module 210 processes the order detail data to identify a particular customer from the customer ID. The second tier processing module 210 then queries the tier two table to identify a matching customer ID and then calculates a global total item count value. The global total item count value includes the desired quantity identified in the particular order and the desired quantity identified in all orders associated with the identified customer ID for the same item that were received during a predetermined time interval. The global total item count is, for example, a total amount of a particular item included in orders that a particular customer has submitted month to date. If the global total item count value is less than (or equal to) the calculated average quantity threshold, then the particular order is not deemed suspicious.

The calculated average quantity threshold corresponds to, for example, an average amount or volume of a particular item ordered by one or more customers over an eighteen month period multiplied by a multiplier (e.g., 2, 3, or 4). Again, the multiplier value is controlled by a value in the processing options of the program.

According to one aspect, the second tier processing module 210 assigns a hold attribute value to a hold flag, or other indicator, associated with the particular order based on whether the global total order value is greater than or equal to the calculated order threshold or whether the global total item count value is greater than or equal to the calculated quantity threshold. The second tier processing module 210 assigns hold attribute value of "Yes", "1", etc. to the hold flag associated with the order if either the global total order value meets or exceeds the calculated order threshold or the global total item count meets or exceeds the calculated quantity threshold. According to one aspect, a non-hold attribute value of, for example, "No", "0", or other null value that indicates the number of orders from a particular customer or the volume of a particular item ordered by a particular customer is less than corresponding threshold values is assigned.

The second tier processing module 210 stores the order detail included in the particular order in the tier two table. The second tier processing module 210 also stores the assigned customer/item attribute values for the new customer/item flags in the tier two table in the data source 106. The second tier processing module 210 further stores the assigned attribute values for the hold flags in the tier two table. According to one aspect, when the attribute value assigned to the hold flag indicates the order is suspicious, that order is placed on hold by the SOMS 100.

The second tier processing module 210 also updates monthly count data maintained in the historical record in the tier two table based on the calculated total quantity of particular items ordered by the particular customer and/or a calculated total number of orders submitted by a particular customer.

A third tier processing module 212 optionally executes to determine a particular amount (e.g., monthly limit) on a particular customer, as identified by that customer's Bill To address, for a particular SKU for a particular amount. According to one aspect, the third tier processing module 212 is selectively executed should a review of a customer for a particular SKU be desired for a particular limit. The third tier processing module 212 processes the order detail data included in a particular order generated by a customer according to tier three processing rules to determine whether that particular order is valid. According to one aspect, the tier three processing rules require first determining whether the particular order is from a current month and year. For example, the tier three processing rules require identifying a date and/or time from the order detail data associated with the particular order. If the identified date and time corresponds to current month and year, that particular order will deemed a valid order. Alternatively, if the identified date and time does not correspond to current month or year, that particular order will be deemed an invalid order.

The tier three processing rules also require identifying the order type to determine whether to flag or otherwise identify that particular order as valid. For example, the tier three processing rules require determining from the order detail data whether the order type is an electronic order received from a known customer (i.e., valid bill to customer ID) via communication network (e.g., online order) or manual order entered via an authorized administrator. If the particular order is not identified as either an electronic order or an administrative order, that particular order will deemed invalid.

The third tier processing module 212 is configured to only identify orders that have not been previously processed according to the tier three processing rules as valid.

The third tier processing module 212 further processes the order detail data included in a particular order generated by a customer according to tier three processing rules to determine whether to flag or otherwise identify that particular order as suspicious. According to one aspect, the tier three processing rules identify the particular order as suspicious by determining whether a particular customer associated with the particular order has exceeded a threshold quantity for a particular item during a predetermined time period. For example, the third tier processing module 212 processes the order detail data included in the particular order to identify a particular customer from the customer ID, a particular item from the item ID, and a desired quantity of the particular product. The third tier processing module 212 then retrieves the threshold quantity for the particular item for that particular customer from the allocation record in the tier three table 132.

The third tier processing module 212 then queries the tier three table 132 to identify a matching customer ID and item ID and then calculates a total order quantity, including the desired quantity specified in the particular order, of the particular product. The total order quantity is, for example, a total quantity that has been ordered month to date. If the total order quantity is less than (or equal to) the threshold order quantity specified by the tier three processing rules, then the particular order is not deemed suspicious.

According to one aspect, the third tier processing module 212 assigns a hold attribute value to a hold flag, or other indicator, associated with the particular order if the total order quantity exceeds the threshold order quantity. For example, the third tier processing module 212 assigns a hold attribute value of, for example, "Yes", "1", etc. to the hold flag associated with the order if the total order quantity exceeds the threshold order quantity to indicate that the particular order or suspicious. According to one aspect, a non-hold attribute value of, for example, "No", "0", or other null value is assigned to the hold flag to indicate the order is not a suspicious order.

The third tier processing module 212 stores the order detail data included in the particular order in the tier three table 132. The third tier processing module 212 also stores the assigned attribute value for the hold flag in the corresponding order record in the tier three table 132 in the data source 106. According to one aspect, when the attribute value assigned to the hold flag indicates the order is suspicious, that order is placed on hold by the SOMS 100. According to one aspect, the corresponding order detail of any record marked as hold will be saved to the reporting file in the general data file storage system 133 and an audit record is written to the tier three hold table 132. The order detail saved to the reporting file 133 is for reporting only. The reporting file is volatile and after the reporting completes the file is cleared.

The third tier processing module 212 also updates monthly count data maintained in the historical record in the tier two table. According to one aspect, the monthly count data corresponds to the calculated total quantity for a particular item ordered by the particular customer during the month. The monthly count data is used, for example, by the SOMA 104 to calculate the average quantity threshold and/or average order thresholds described above.

According to another aspect, rather than updating the historical record in the tier two table 130, the third tier processing module 212 updates summary audit files and sales ledger files in the general data file storage system 133 and then writes a record to the reporting file general data file storage system 133.

A notification module 214 communicates hold notification to various individuals or entities via a communication network. The hold notification identifies one or more order records in the tiers one, tier two, and/or tier three tables that include a hold attribute value. The notification module 214 retrieves address information for one or more individuals from another data source, such as notification address database (not shown). The notification address database includes, for example, e-mail addresses, telephone numbers, etc. for individuals that are to be notified of orders on hold. In this example, the hold notification can be in the form of an e-mail communication delivered to an e-mail address or a text (SMS) message delivered to a telephone number of mobile phone.

According to one aspect, the notification module 214 transmits a hold notification for a particular order immediately upon that order being identified as suspicious by the SOMS 100. According to another aspect, the notification module 214 transmits a hold notification for one or more orders at predetermined intervals (e.g., 12 hours).

Figure 3:
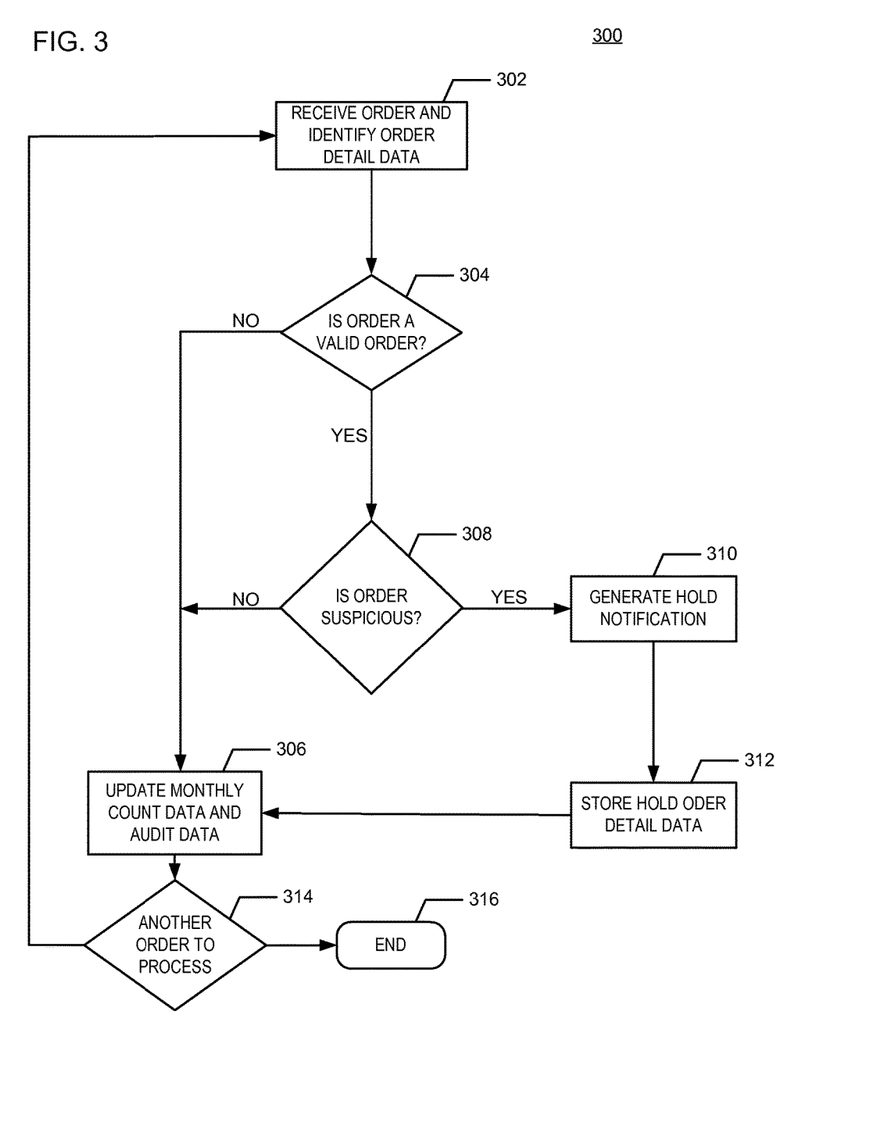
FIG. 3 is an exemplary process flow depicting methods for processing orders based no first processing rules according one aspect of the suspicious order monitoring system.

FIG. 3 depicts an exemplary method for processing a received order for an item according to tier one processing rules. At 302, a particular order for an item is received at the SOMS 100 and processed to identify order detail data. The SOMA 104 determines if the order is a valid order at 304. As an example, as described above, the SOMA 104 determines whether the received order is valid based on a date and/or time included in detail data associated with the particular order. As another example, the SOMA 104 determines whether the received order is valid based on an order type (e.g., electronic order or an administrative order) identified by the order detail data associated with the particular order. At 306, if the order is invalid, the SOMA 104 updates count data and audit data corresponding to a predetermined time period (e.g., monthly) and saves in a general file data storage system.

If the order is determined to be valid at 304, the SOMA 104 determines if the order is suspicious at 308. For example, as described above, the SOMA 104 determines whether the particular order is suspicious based on whether the order exceeds a threshold quantity and/or a total order quantity for an associated customer exceeds a threshold total order quantity. If the order is not deemed suspicious at 308, the SOMA 104 updates monthly count data and monthly audit data and saves in the general file data storage system at 306.

If the order is determined to be suspicious at 308, the SOMA 104 assigns a hold attribute value to a hold flag, or other indicator, included in detail data associated with the particular order and generates a hold notification for transmission and/or display at 310. According to another aspect, the hold notification is generated and transmitted to the administrative computing device 110 for display. At 312, the SOMA 104 stores the hold order detail data in the tier one data table. The SOMA 104 then updates monthly count data and monthly audit data and saves in the general file data storage system at 306.

At 314, the SOMA 104 determines if there is another order to process. If there is not another order to process, the SOMA 104 terminates at 316. If there is another order to process, the SOMA 104 returns to 302 to initiate processing of the next order.

Figure 4:
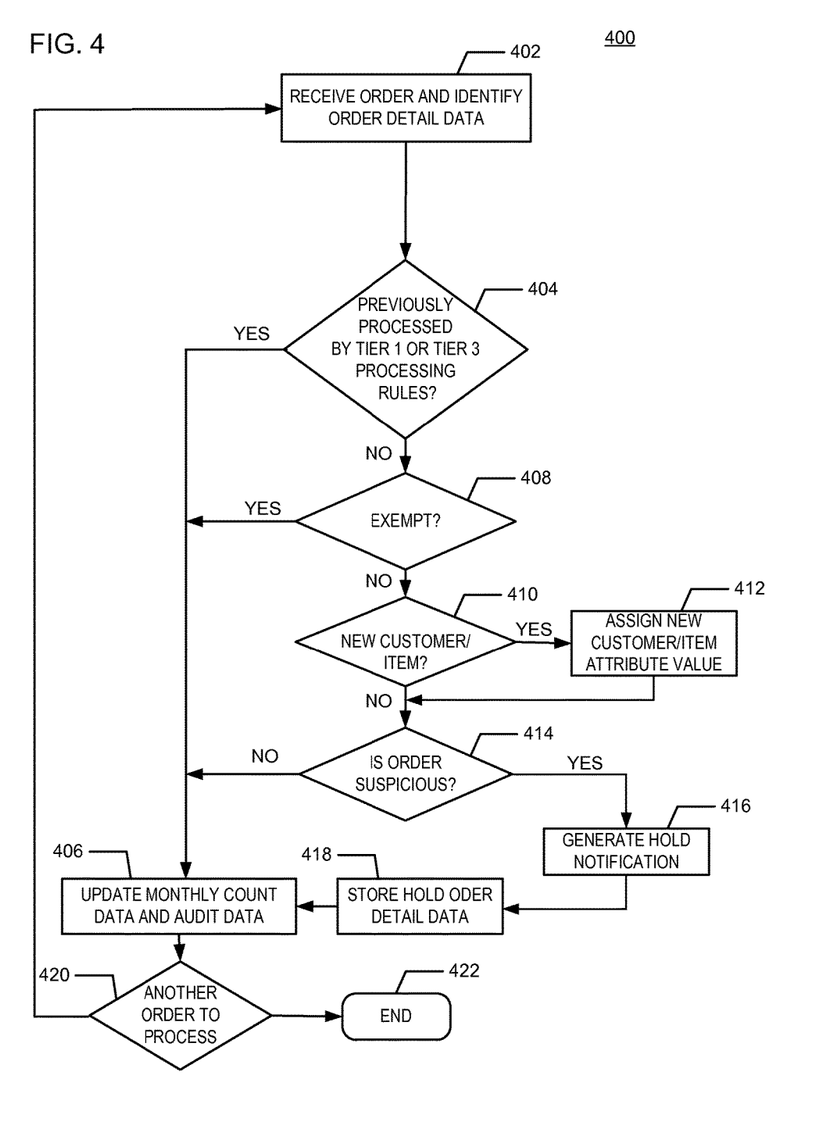
FIG. 4 is an exemplary process flow depicting methods for processing orders based on second processing rules according one aspect of the suspicious order monitoring system.

FIG. 4 depicts an exemplary method for processing a received order according to tier two processing rules. At 402, a particular order for an item is received at the SOMS 100 and processed to identify order detail data. The SOMA 104 determines if the order was previously processed according to the tier one or tier three processing rules at 404. If the order was previously processed to the tier one or tier three processing rules, the SOMA 104 updates count data and audit data corresponding to a predetermined time period (e.g., monthly) and saves in a general file data storage system at 406.

If the order was not previously processed, the SOMA 104 determines whether the particular order is exempt from processing by the tier two processing rules at 408. For example, as described above, the SOMA 104 determines whether the particular order is exempt by comparing order detail data (e.g., an item identification code associated with the particular order with a retrieved the list of item codes for exempt items. If the order is exempt at 408, the SOMA 104 updates monthly count data and monthly audit data and saves in the general file data storage system at 406.

If the order is not exempt at 408, the SOMA 104 determines whether the particular order was received from a new customer or associated with a new item at 410. If the particular order was received from a new customer or associated with a new item at 410, the SOMA 104 assigns a new customer/item attribute value to the order detail data at 412. As described above, the new customer/item attribute value is, for example, "Yes", "1", or any other value that indicates that the customer and/or item identified in the particular order are considered new.

After a new customer/item attribute value is assigned a 412 or if the particular order was not received from a new customer nor associated with a new item at 410, the SOMA 104 determines if the order is suspicious at 414. For example, as described above, the SOMA 104 determines whether the particular order is suspicious based on whether based on whether the number of orders received from a corresponding customer exceeds a calculated average order threshold or if a quantity of a particular item ordered by a particular customer has exceeded a calculated average quantity threshold. If the order is not suspicious at 414, the SOMA 104 updates monthly count data and monthly audit data and saves in the general file data storage system at 406.

If the order is determined to be suspicious at 414, the SOMA 104 assigns a hold attribute value to a hold flag, or other indicator, to detail data associated with the particular order and generates a hold notification for transmission or display at 416. According to another aspect, the hold notification is generated and transmitted to the administrative computing device 110 for display. At 418, the SOMA 104 stores the hold order detail data in the tier two data table. The SOMA 104 then updates monthly count data and monthly audit and saves in a general file data storage system at 406.

At 420, the SOMA 104 determines if there is another order to process. If there is not another order to process, the SOMA 104 terminates at 422. If there is another order to process, the SOMA 104 returns to 402 to initiate processing of the next order.

Figure 5:
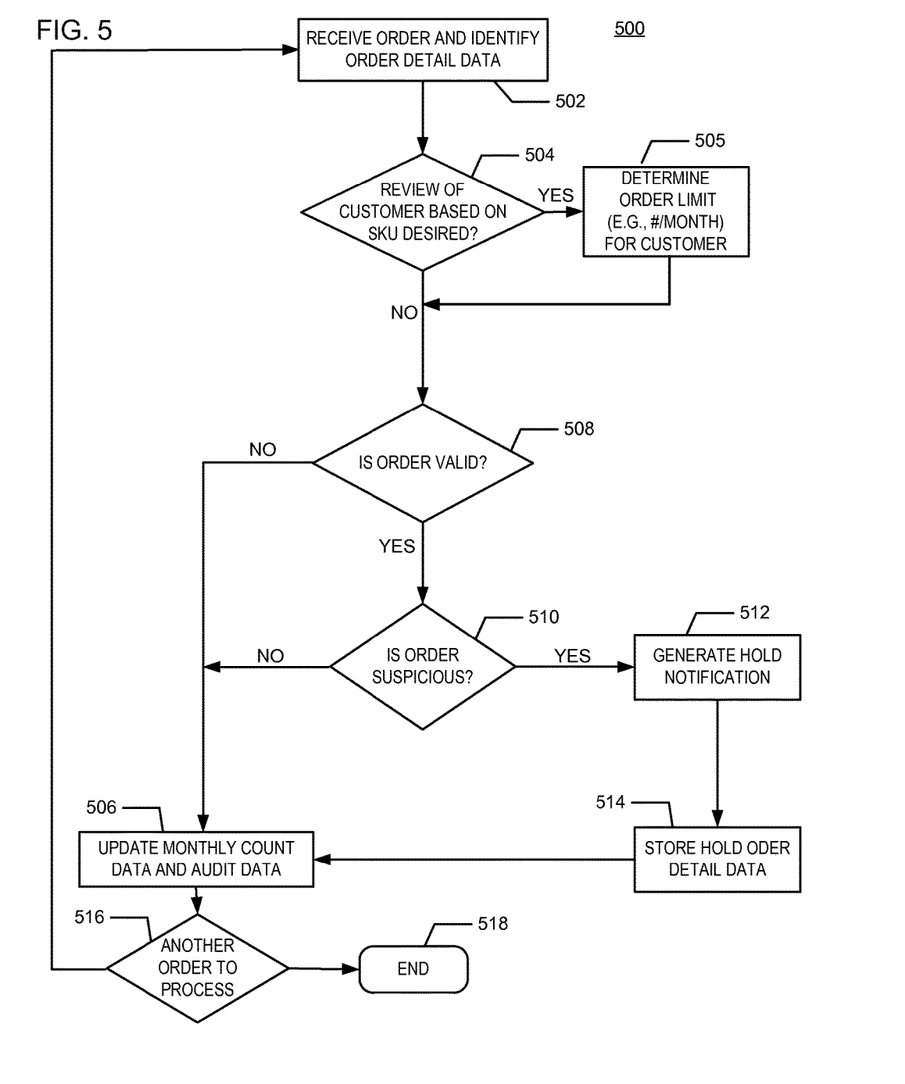
FIG. 5 is an exemplary process flow depicting methods for processing orders based on third processing rules according one aspect of the suspicious order monitoring system.

FIG. 5 depicts an exemplary method for processing a received order according to tier three processing rules. At 502, a particular order for an item is received at the SOMS 100 and processed to identify order detail data. The SOMA 104 provides a user to the option determine whether a review of the customer is desired based on item code or number (e.g., SKU) associated with the particular order at 504. If a review of the customer is desired at 504, the SOMA 104 determines a particular maximum amount (e.g., monthly limit) for a particular customer and particular item associated with the particular order at 505. According to one aspect, the particular maximum amount is predefined and retrieved from a data source (e.g., tier three table or general file data storage system).

After determining a particular maximum amount at 505 or if a review of the customer is not desired at 504, the SOMA 104 determines if the order is a valid at 508. For example, as described above, the SOMA 104 determines whether the received order is valid based on a date and/or time associated with the particular order and/or based on an order type (e.g., electronic order or an administrative order) associated with the particular order. If the order is invalid at 508, the SOMA 104 updates count data and audit data corresponding to a predetermined time period (e.g., monthly) and saves in a general file data storage system at 506.

If the order is determined to be valid at 508, the SOMA 104 determines if the order is suspicious at 510. For example, as described above, the SOMA 104 determines whether the particular order is suspicious based on whether the order exceeds a threshold quantity and/or a total order quantity for an associated customer exceeds a threshold total order quantity. If the order is not suspicious at 510, the SOMA 104 updates monthly count data and monthly audit data and saves in a general file data storage system at 506.

If the order is determined to be suspicious at 510, the SOMA 104 assigns a hold attribute value to a hold flag, or other indicator, to detail data associated with the particular order and generates a hold notification for transmission and/or display at 512. According to another aspect, the hold notification is generated and transmitted to the administrative computing device 110 for display. At 514, the SOMA 104 stores the hold order detail data in the tier one data table. The SOMA 104 then updates monthly count data and audit and saves in a general file data storage system at 506.

At 516, the SOMA 104 determines if there is another order to process. If there is not another order to process, the SOMA 104 terminates at 518. If there is another order to process, the SOMA 104 returns to 502 to initiate processing of the next order.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology.

What is claimed is:

1. A method for identifying a suspicious order for an item, the method comprising:
    retrieving, by at least one processor, at a particular interval of time, an electronic order from a memory queue, and processing the electronic order according to first in first out (FIFO) processing to parse order detail data from the electronic order;
    receiving, by the at least one processor, the order detail data included in the electronic order received from one or more remote devices, the order detail data comprising an item identification code for a particular item, a customer identification for a particular customer, and an order type, the electronic order encapsulated in an order request generated at the one or more remote devices;
    upon immediate receipt of the electronic order from the memory queue, processing the order detail data according to first processing rules of a set of processing rules to determine if the electronic order is a suspicious order, each processing rules of the set of processing rules corresponding to a tiered data table of a plurality of tiered data tables maintained in a database, and wherein the first processing rules determines that the electronic order is suspicious by determining that the electronic order was received from a particular customer based on the customer identification over a communications network;
    storing the order detail data in a first data table of the plurality of tiered data tables, when the electronic order is determined to be a suspicious order based on the first processing rules;
    processing the order detail data according to second processing rules to determine if the electronic order is a suspicious order by determining that the order request exceeds a threshold number of requests for the item during a predetermined period of time;
    storing the order detail data in a second data table of the tiered data tables if the electronic order is determined to be a suspicious order based on the second processing rules;
    processing the order detail data according to third processing rules to determine if the electronic order is a suspicious order when the order detail data has not been determined to be suspicious according to the first processing rules or the second processing rules;
    assigning a hold attribute value to a hold flag associated with the electronic order when the order is determined to be suspicious by one of the first processing rules, second processing rules, or third processing rules, placing the electronic order on hold, and preventing the electronic order from executing; and
    transmitting, in real-time, a hold notification via a communication network to network addresses of the one or more remote computing devices when the hold flag associated with the electronic order has the hold attribute value and displaying a notification that indicates that the electronic order is placed on hold on a user interface displayed by the one or more remote computing devices.

2. The method of claim 1 wherein processing the order detail data according to the first processing rules comprises:
    identifying the particular customer, the particular item being ordered, and a desired quantity of the particular item;
    retrieving a threshold quantity for the particular item for the particular customer from an allocation record in the first table; and
    identifying the electronic order as suspicious when the desired quantity exceeds the threshold quantity for the particular item during a defined time period.

3. The method of claim 2 wherein the hold attribute value is assigned to the hold flag associated with the electronic order when the desired quantity exceeds the threshold quantity.

4. The method of claim 2 wherein processing the order detail data according to the first processing rules comprises:
    querying the first table to:
    identify a particular customer identification (ID) code for the particular customer;
    identify a particular item identification (ID) code for the particular item;
    querying historical order detail data in the first table to identify matching orders received within the defined time period, each matching order comprising a matching customer ID code that matches the particular customer ID code and matching item ID code that matches the particular item ID code;
    identifying a previous order quantity associated with each matching order;

calculating a total quantity based on the desired quantity and each previous order quantity; and identifying the electronic order as suspicious when the total quantity exceeds a total threshold quantity during the defined time period.

5. The method of claim 4 wherein the hold attribute value is assigned to the hold flag associated with the electronic order when the total quantity exceeds the total threshold quantity.

6. The method of claim 1 wherein processing the order detail data according to the second processing rules comprises:

updating monthly count data included in the second data table when the order detail data included on the electronic order has previously been processed according to the first processing rules or the third processing rules, wherein the updating monthly count data comprises:

identifying a particular customer identification (ID) code for the particular customer included in the order detail data;

identifying a particular item identification (ID) code for the particular item included in the order detail data;

querying historical order detail data in the second table to identify matching orders received within the defined time period, each matching order comprising a matching customer ID code that matches the particular customer ID code and matching item ID code that matches the particular item ID code;

identifying a previous order quantity associated with each matching order;

calculating a total quantity based on the desired quantity and each previous order quantity; and updating the monthly count data in the second data table to correspond to the total quantity.

7. The method of claim 6 wherein processing the order detail data according to the second processing rules comprises:

retrieving a list of exempt items from a data source when the electronic order has not been processed according to the first processing rules or the third processing rules, the list of exempt items identifying one or more exempt item ID codes that are exempt from processing according to the second processing rules;

identifying the particular customer identification (ID) code for the particular customer included in the order detail data;

identifying the particular item identification (ID) code for the particular item included in the order detail data;

comparing the particular item ID code to the list of exempt items; and exempting the order detail data from processing according to the second processing rules when the particular item ID code matches at least one of the exempt item ID codes included in the list of exempt items.

8. The method of claim 6 wherein processing the order detail data according to the second processing rules comprises:

querying historical order detail data in the second table to identify second matching orders received within the defined time period, each second matching order comprising a matching customer ID code that matches the particular customer ID code;

identifying an item order quantity associated with each second matching order;

calculating a global total order value based on the desired quantity and each item order quantity; and identifying the electronic order as suspicious when the customer global total quantity exceeds a customer global total threshold quantity during the defined time period.

9. The method of claim 6 wherein processing the order detail data according to the second processing rules comprises:

querying historical order detail data in the second table to identify matching orders received within the defined time period, each matching order comprising a matching customer ID code that matches the particular customer ID code and matching item ID code that matches the particular item ID code;

calculating a global total item count based on the desired quantity identified in the electronic order and the desired quantity identified in all matching orders received during the defined time period;

calculating an average quantity threshold value based on average quantity of the particular item ordered by one or more customers over a predetermined period of time and a multiplier; and identifying the electronic order as suspicious when the global total item count exceeds the average quantity threshold value during the defined time period.

10. The system of claim 6 wherein the application executed by the at least one processor further processes the order detail data according to the second processing rules by:

retrieving a list of exempt items from a data source when the electronic order has not been processed according to the first processing rules or the third processing rules, the list of exempt items identifying one or more exempt item ID codes that are exempt from processing according to the second processing rules;

identifying the particular customer identification (ID) code for the particular customer included in the order detail data;

identifying the particular item identification (ID) code for the particular item included in the order detail data;

comparing the particular item ID code to the list of exempt items; and exempting the order detail data from processing according to the second processing rules when the particular item ID code matches at least one of the exempt item ID codes included in the list of exempt items.

11. The system of claim 6 wherein the application executed by the at least one processor further processes the order detail data according to the second processing rules by:

querying historical order detail data in the second table to identify second matching orders received within the defined time period, each second matching order comprising a matching customer ID code that matches the particular customer ID code;

identifying an item order quantity associated with each second matching order;

calculating a global total order value based on the desired quantity and each item order quantity; and identifying the electronic order as suspicious when the customer global total quantity exceeds a customer global total threshold quantity during the defined time period.

12. The system of claim 6 wherein the application executed by the at least one processor further processes the order detail data according to the second processing rules by:

querying historical order detail data in the second table to identify matching orders received within the defined time period, each matching order comprising a matching customer ID code that matches the particular customer ID code and matching item ID code that matches the particular item ID code;

calculating a global total item count based on the desired quantity identified in the electronic order and the desired quantity identified in all matching orders received during the defined time period;

calculating an average quantity threshold value based on average quantity of the particular item ordered by one or more customers over a predetermined period of time and a multiplier; and identifying the electronic order as suspicious when the global total item count exceeds the average quantity threshold value during the defined time period.

13. The method of claim 1 wherein processing the order detail data according to the third processing rules comprises:

identifying the particular customer identification (ID) code for the particular customer included in the order detail data;

retrieve an order limit from a third data table based on the particular customer, the order limit comprising a limit on the quantity of items for the particular customer based on an associated bill to address;

querying historical order detail data in the third table to identify matching orders received within the defined time period, each matching order comprising a matching customer ID code that matches the particular customer ID code and matching item ID code that matches the particular item ID code;

identifying a previous order quantity associated with each matching order;

calculating a total quantity based on the desired quantity and each previous order quantity; and identifying the electronic order as suspicious when the total quantity exceeds a total threshold quantity during the defined time period.

14. A system for identifying a suspicious order for an item, the system comprising:

at least one processor;

at least one data source comprising:

a first data table;

a second data table; and a third data table; and an application executed by the at least one processor to:

retrieve at a particular interval of time, an electronic order from a memory queue, and process the electronic order according to first in first out (FIFO) processing to parse order detail data from the electronic order;

identify order detail data included in the electronic order received from the at least one processor, the order detail data comprising an item identification code for a particular item, a customer identification for a particular customer, and an order type, the electronic order encapsulated in an order request generated by the at least one processor;

upon immediate receipt of the electronic order from the memory queue, processing the order detail data according to first processing rules of a set of processing rules to determine if the electronic order is a suspicious order, each processing rules of the set of processing rules corresponding to a tiered data table of a plurality of tiered data tables maintained in a database, and wherein the first processing rules determines that the electronic order is suspicious by determining that the electronic order was received from a particular customer based on the customer identification over a communications network;

store the order detail data in the first data table of the plurality of tiered data tables when the electronic order is determined to be suspicious based on the first processing rules;

process the order detail data according to second processing rules to determine when the electronic order is suspicious when the order detail data has not been determined to be suspicious according to the first processing rules or third processing rules by determining that the order request exceeds a threshold number of requests for the item during a predetermined period of time;

store the order detail data in a second data table of the plurality of tiered data tables when the electronic order is determined to be suspicious order based on the second processing rules;

process the order detail data according to the third processing rules to determine if the electronic order is suspicious when the order detail data has not been processed according to the first processing rules or the second processing rules;

assign a hold attribute value to a hold flag associated with the electronic order when the electronic order is determined to be suspicious by one of the first processing rules, second processing rules, or third processing rules, place the electronic order on hold, and prevent the electronic order from executing; and transmit, in real-time, a hold notification via a communication network to network addresses of one or more remote devices when the hold flag associated with the order has the hold attribute value and display a notification that indicates that the electronic order is placed on hold on a user interface displayed by the one or more remote devices.

15. The system of claim 14 wherein the application executed by the at least one processor processes the order detail data according to the first processing rules by:

identifying the particular customer, the particular item being ordered, and a desired quantity of the particular item;

retrieving a threshold quantity for the particular item for the particular customer from an allocation record in the first table; and identifying the electronic order as suspicious when the desired quantity exceeds the threshold quantity for the particular item during a defined time period.

16. The system of claim 15 wherein the hold attribute value is assigned to the hold flag associated with the electronic order when the desired quantity exceeds the threshold quantity.

17. The method system of claim 15 wherein the application executed by the at least one processor processes the order detail data according to the first processing rules by:

querying the first table to:

identify a particular customer identification (ID) code for the particular customer;

identify a particular item identification (ID) code for the particular item;

querying historical order detail data in the first table to identify matching orders received within the defined time period, each matching order comprising a matching customer ID code that matches the particular customer ID code and matching item ID code that matches the particular item ID code;

identifying a previous order quantity associated with each matching order;

calculating a total quantity based on the desired quantity and each previous order quantity; and identifying the electronic order as suspicious when the total quantity exceeds a total threshold quantity during the defined time period.

18. The system of claim 17 wherein the hold attribute value is assigned to the hold flag associated with the electronic order when the total quantity exceeds the total threshold quantity.

19. The system of claim 14 wherein the application executed by the at least one processor processes the order detail data according to the second processing rules by:

updating monthly count data included in the second data table when the order detail data included on the electronic order has previously been processed according to the first processing rules or the third processing rules, wherein the updating monthly count data comprises:

identifying a particular customer identification (ID) code for the particular customer included in the order detail data;

identifying a particular item identification (ID) code for the particular item included in the order detail data;

querying historical order detail data in the second table to identify matching orders received within the defined time period, each matching order comprising a matching customer ID code that matches the particular customer ID code and matching item ID code that matches the particular item ID code;

identifying a previous order quantity associated with each matching order;

calculating a total quantity based on the desired quantity and each previous order quantity; and updating the monthly count data in the second data table to correspond to the total quantity.

20. The system of claim 14 wherein the application executed by the at least one processor processes the order detail data according to the third processing rules by:

identifying the particular customer identification (ID) code for the particular customer included in the order detail data;

retrieve an order limit from a third data table based on the particular customer, the order limit comprising a limit on the quantity of items for the particular customer based on an associated bill to address;

querying historical order detail data in the third table to identify matching orders received within the defined time period, each matching order comprising a matching customer ID code that matches the particular customer ID code and matching item ID code that matches the particular item ID code;

identifying a previous order quantity associated with each matching order;

calculating a total quantity based on the desired quantity and each previous order quantity; and identifying the electronic order as suspicious when the total quantity exceeds a total threshold quantity during the defined time period.

\* \* \* \* \*